US007639846B2

(12) United States Patent
Yoda

(10) Patent No.: US 7,639,846 B2
(45) Date of Patent: Dec. 29, 2009

(54) AUTHENTICATION SYSTEM AND PROGRAM

(75) Inventor: Akira Yoda, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 602 days.

(21) Appl. No.: 10/951,636

(22) Filed: Sep. 29, 2004

(65) Prior Publication Data

US 2005/0212654 A1 Sep. 29, 2005

(30) Foreign Application Priority Data

Sep. 29, 2003 (JP) ............................ 2003-338804
Sep. 1, 2004 (JP) ............................ 2004-254993

(51) Int. Cl.
*G06K 9/00* (2006.01)
*G06T 1/00* (2006.01)

(52) U.S. Cl. .................................... 382/118; 340/5.83

(58) Field of Classification Search ................ 382/118; 340/5.83
See application file for complete search history.

(56) References Cited

U.S. PATENT DOCUMENTS 4,821,118 A * 4/1989 Lafreniere .................. 348/156
5,987,261 A * 11/1999 Sugahara et al. .............. 396/61
6,496,594 B1 * 12/2002 Prokoski ..................... 382/118
6,799,275 B1 * 9/2004 Bjorn ......................... 713/186
6,970,846 B1 * 11/2005 Drummond et al. ........... 705/43
7,120,278 B2 * 10/2006 Sukegawa et al. ........... 382/118
7,266,224 B2 * 9/2007 Sukegawa ................... 382/118
2002/0191817 A1 * 12/2002 Sato et al. ................... 382/118
2004/0008872 A1 * 1/2004 Goldberg .................... 382/115
2004/0190757 A1 * 9/2004 Murphy et al. .............. 382/115

* cited by examiner

*Primary Examiner*—Bhavesh M Mehta
*Assistant Examiner*—Kathleen S Yuan
(74) *Attorney, Agent, or Firm*—Sughrue Mion, PLLC

(57) ABSTRACT

An authentication system for authenticating a person-to-be-authenticated, including: a first photographing section, which is provided in a route passed by the person-to-be-authenticated, operable to photograph the person-to-be-authenticated; a first authentication section operable to perform a first authentication of the person-to-be-authenticated photographed by the first photographing section; a second photographing section, which is provided at a location through which the person-to-be-authenticated passes, operable to photograph the person-to-be-authenticated, wherein the second photographing section is located downstream of the first photographing section in the route passed by the person-to-be-authenticated; and a second authentication section operable to authenticate the person-to-be-authenticated by comparing an image of the person-to-be-authenticated photographed by the first photographing section with an image of the person-to-be-authenticated photographed by the second photographing section.

13 Claims, 7 Drawing Sheets

AUTHENTICATION SYSTEM AND PROGRAM

This patent application claims priority from Japanese. patent applications Nos. 2003-338804 filed on Sep. 29, 2003 and 2004-254993 filed on Sep. 1, 2004, the contents of which are incorporated herein by reference.

BACKGROUND OF THE INVENTION

1. Field of the Invention

The present invention relates to an authentication system, a machine readable medium storing thereon a plurality of machine readable instructions, and a building. More particularly, the present invention relates to an authentication system which authenticates a person-to-be-authenticated.

2. Description of the Related Art

Conventionally, as means to authenticate a person, a system is known that photographs a person's image and authenticate the person by comparing the image with a person's image registered in advance. For example, a visitor may be photographed at entrance of a living room, and authenticate the visitor by deciding whether the visitor is registered or not to decide whether the entrance of the visitor into the room is allowed or not.

For example, it is desired to efficiently authenticate a person at a place where many people visit such as a living room. However, when a long time has elapsed since the person's image is registered, the person's face has changed by aging or the like. Therefore, in the conventional art, when it was going to improve accuracy of the authentication, since the authentication had to consider the secular change, it took a long time for the authentication and there was a case where the authentication could not be performed efficiently.

SUMMARY OF THE INVENTION

Therefore, it is an object of the present invention. to provide an authentication system, a machine readable medium storing thereon a plurality of machine readable instructions, and a building, which are capable of overcoming the above drawbacks accompanying the conventional art. The above and other objects can be achieved by combinations described in the independent claims. The dependent claims define further advantageous and exemplary combinations of the present invention.

To solve the foregoing problems, according to a first aspect of the present invention, there is provided an authentication system for authenticating a person-to-be-authenticated The authentication system includes: a first photographing section, which is provided in a route passed by the person-to-be-authenticated, operable to photograph the person-to-be-authenticated; a first authentication section operable to perform a first authentication of the person-to-be-authenticated photographed by the first photographing section; a second photographing section, which is provided at a location through which the person-to-be-authenticated passes, operable to photograph the person-to-be-authenticated,. wherein the second photographing section is located downstream of the first photographing section in the route passed by the person-to-be-authenticated; and a second authentication section operable to authenticate the person-to-be-authenticated by comparing an image of the person-to-be-authenticated photographed by the first photographing section with an image of the person-to-be-authenticated photographed by the second photographing section.

Moreover, the authentication system may further include: a first gate provided in the route passed by the person-to-be-authenticated; a second gate provided at the location through which the person-to-be-authenticated passes, wherein the second gate is located downstream of the first gate in the route; wherein the first authentication section may open the first gate when it authenticates the person-to-be-authenticated as a person who is permitted to pass the first gate, and the second authentication section may open the second gate when it authenticates the person-to-be-authenticated as a person who is permitted to pass the second gate.

Moreover, the first authentication section may authenticate the person-to-be-authenticated by comparing an image of the person-to-be-authenticated stored on an ID card retained by the person-to-be-authenticated with an image of the person-to-be-authenticated photographed by the first photographing section.

Moreover, the authentication system may further include an image storage section storing thereon an image of the person-to-be-authenticated in advance, wherein the first authentication section may authenticate the person-to-be-authenticated by comparing the image of the person-to-be-authenticated stored on the image storage section with the image of the person-to-be-authenticated photographed by the first photographing section.

Moreover, the first photographing section may photograph an authentication image used by the first authentication section for the first authentication and further photograph a first comparison image in which the person-to-be-authenticated is photographed and of which the area to be photographed is larger than the authentication image, and the second photographing section may photograph a second comparison image in which the person-to-be-authenticated is photographed and of which a photographed area is substantially the same as that of the first comparison image, and the second authentication section may authenticate the person-to-be-authenticated by comparing the first comparison image and the second comparison image.

The first authentication section may perform the first authentication based on image of face of the person-to-be-authenticated in the authentication image, and the second authentication section may authenticate the person-to-be-authenticated based on image of face and dress of the person-to-be-authenticated in the first comparison image and the second comparison image.

The second authentication section may compute lighting conditions when the first photographing section photographs the person-to-be-authenticated based on the image photographed by the first photographing section photographed, and may control the lighting conditions at a time of the second photographing section photographing the person-to-be-authenticated according to the computed lighting conditions.

The second photographing section may include a flash section operable to flare flashlight to the person-to-be-authenticated, and the second authentication section may detect brightness of the image of the person-to-be-authenticated photographed by the first photographing section, and control the luminous intensity of the flash section based on the detected brightness of the image.

According to a second aspect of the present invention, there is provided an article including a storage medium having a plurality of machine readable instructions for operating an authentication system for authenticating a person-to-be-authenticated, wherein when the instructions are executed, the instructions causes the authentication system to act as; a first authentication section operable to perform a first authentication of the person-to-be-authenticated, wherein the first authentication section is provided in a route passed by the person-to-be-authenticated; a first photographing section operable to photograph the person-to-be-authenticated who is authenticated by the first authentication section; a second photographing section, which is provided at a location through which the person-to-be-authenticated passes, operable to photograph the person-to-be-authenticated, wherein the second photographing section is located downstream of the first authentication section in the route passed by the person-to-be-authenticated; and a second authentication section operable to authenticate the person-to-be-authenticated by comparing an image of the person-to-be-authenticated photographed by the first photographing section with an image of the person-to-be-authenticated photographed by the second photographing section.

According to a third aspect of the present invention, there is provided a building equipped with an authentication system for authenticating a person-to-be-authenticated. The building includes: a first gate provided in a route passed by the person-to-be-authenticated; a first photographing section, which is provided in the route, operable to photograph the person-to-be-authenticated; a first authentication section operable to perform a first authentication of the person-to-be-authenticated photographed by the first photographing section; a second gate provided at the location through which the person-to-be-authenticated passes, wherein the second gate is located downstream of the first gate in the route passed by the person-to-be-authenticated; a second photographing section operable to photograph the person-to-be-authenticated, wherein the second photographing section is located downstream of the first photographing section in the route passed by the person-to-be-authenticated; and a second authentication section operable to authenticates the person-to-be-authenticated by comparing an image of the person-to-be-authenticated photographed by the first photographing section with an image of the person-to-be-authenticated photographed by the second photographing section, wherein the first authentication section opens the first gate when it authenticates the person-to-be-authenticated as a person who is permitted to pass the first gate, and the second authentication section opens the second gate when it authenticates the person-to-be-authenticated as a person who is permitted to pass the second gate.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

EXAMPLE 1

Figure 1:
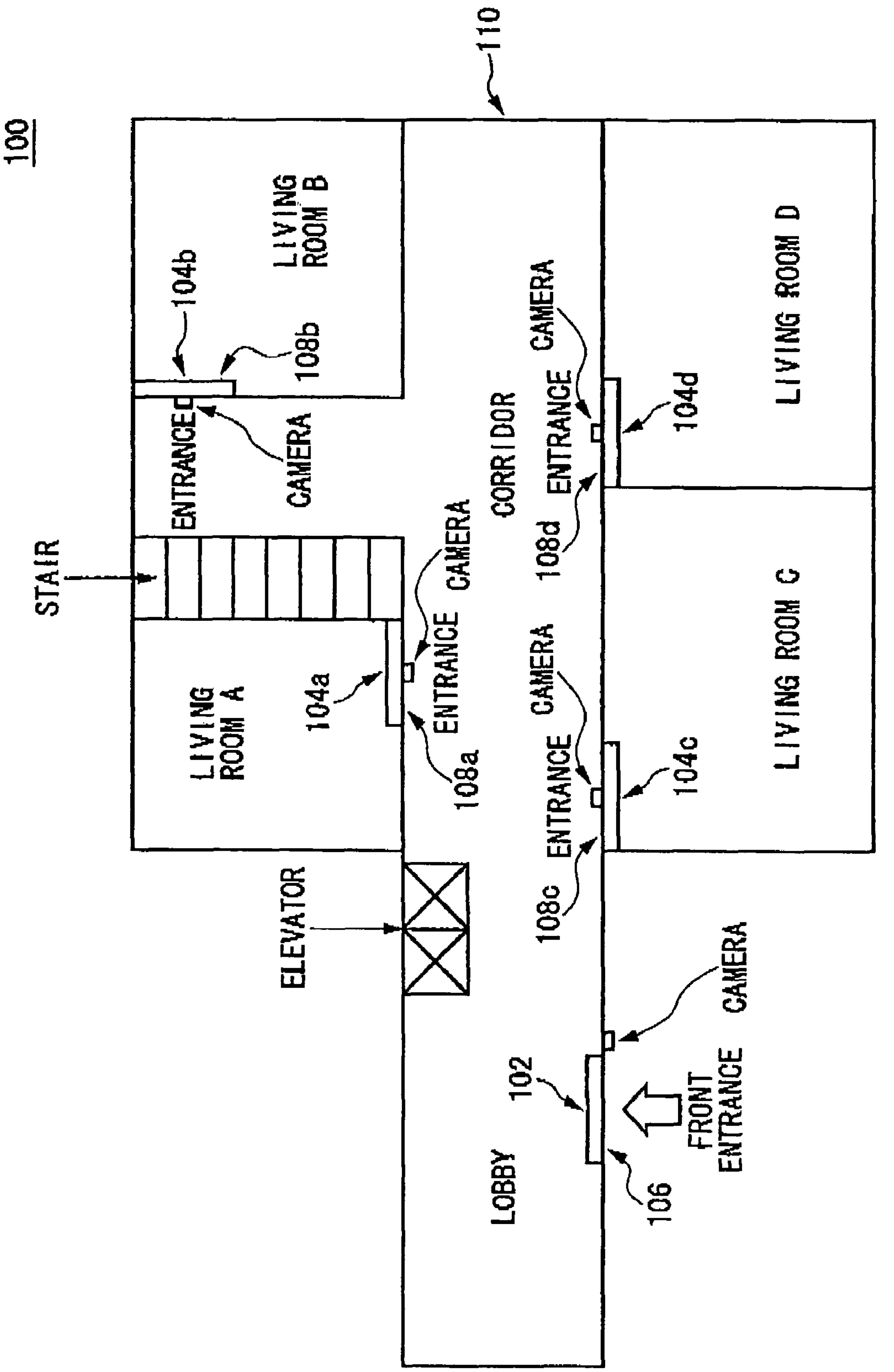
FIG. 1 is a schematic drawing illustrating outline of an authentication system 100 according to an embodiment of the present invention.

FIG. 1 is a schematic drawing illustrating outline of an authentication system 100 according to an embodiment of the present invention. The authentication system 100 is provided in a building 110 including a front entrance and a plurality of living rooms A-D. It is an object of the authentication system 100 according to the present example to efficiently perform authentication for entering the living rooms A-D. The person-to-be-authenticated who enters the living rooms A-D is authenticated at first at an admission-to-building management section 102 provided at the front entrance. The admission-to-building management section 102 authenticates whether the person-to-be-authenticated is a person who is permitted to pass a door 106 of the front entrance. In addition, the door 106 is an example of a first gate provided in a route passed by the person-to-be-authenticated.

In this example, the person-to-be-authenticated retains an ID card storing thereon face image of the person, and the person is authenticated using the ID card at the admission-to-building management section 102. The admission-to-building management section 102 photographs the face image of the person-to-be-authenticated with a camera. Then, the admission-to-building management section 102 authenticates the person-to-be-authenticated by comparing the photographed image with the face image stored on the ID card retained by-the person-to-be-authenticated. When the person-to-be-authenticated is authenticated, the admission-to-building management section 102 transmits the photographed image of the authenticated person to admission-to-room management sections 104*a-d*, which are provided at entrances of the living rooms A-D, respectively, while permitting passage of the front entrance to the person-to-be-authenticated.

If the person authenticated by the admission-to-building management section 102 passes through lobby and corridor, which are a route from the front entrance to each of the living rooms A-D, and arrives at the entrance of one of the living rooms A-D, the person-to-be-authenticated will be authenticated by one of the admission-to-room management section 104*a-d* of respective one of the living rooms A-D. Admission-to-room management sections 104*a-d* authenticate whether the person-to-be-authenticated is a person who is permitted to pass doors 108*a-d* of the living rooms A-F, respectively. In addition, each of the doors 108*a-d* is an example of a second gate, and is provided at a location through which a person-to-be-authenticated passes after he/she has passed the door 106 in the route passed by the person-to-be-authenticated.

In this example, each of the admission-to-room management sections 104*a-d* photographs the face image of the person-to-be-authenticated with a camera. Then, each of the admission-to-room management sections 104*a-d* authenticates the person-to-be-authenticated by comparing the photographed face image with the face image of the person-to-be-authenticated received from the admission-to-building management section 102. Then, when the person-to-be-authenticated is authenticated, admission-to-room management section 104*a-d* permits the entrance into each of the living rooms A-D to the person-to-be-authenticated.

Here, the face image stored on the ID card may be different with the face image of the person-to-be-authenticated photographed at the time of authentication due to the secular change of the face, e.g., growing fat, becoming thin, wearing makeup, and the like. Therefore, if each of the admission-to-room management sections 104*a-d* compares the photographed image with the image stored on the ID card, it takes a long time for the authentication to authenticate the person in high accuracy. In this case, when the effectiveness of the authentication at the time of the entrance into each of the living rooms A-D decreases, smoothness of movement between the living rooms A-D may be spoiled.

However, in this example, the authentication can be done efficiently without the influence of the secular change of the face image by performing authentication using the face image photographed at the front entrance when the person enters each of the living rooms A-D. Therefore, according to this example, the authentication system 100 can efficiently authenticate the person-to-be-authenticated who enters each of the living rooms. A-D. Moreover, in this example, an unauthorized person's admission to the building who is not registered can be prevented by performing authentication using the face image stored on the ID card in advance at the front entrance at the time of admission to the building. Therefore, according to the present example, secure and efficient authentication system 100 can be provided.

Figure 2:
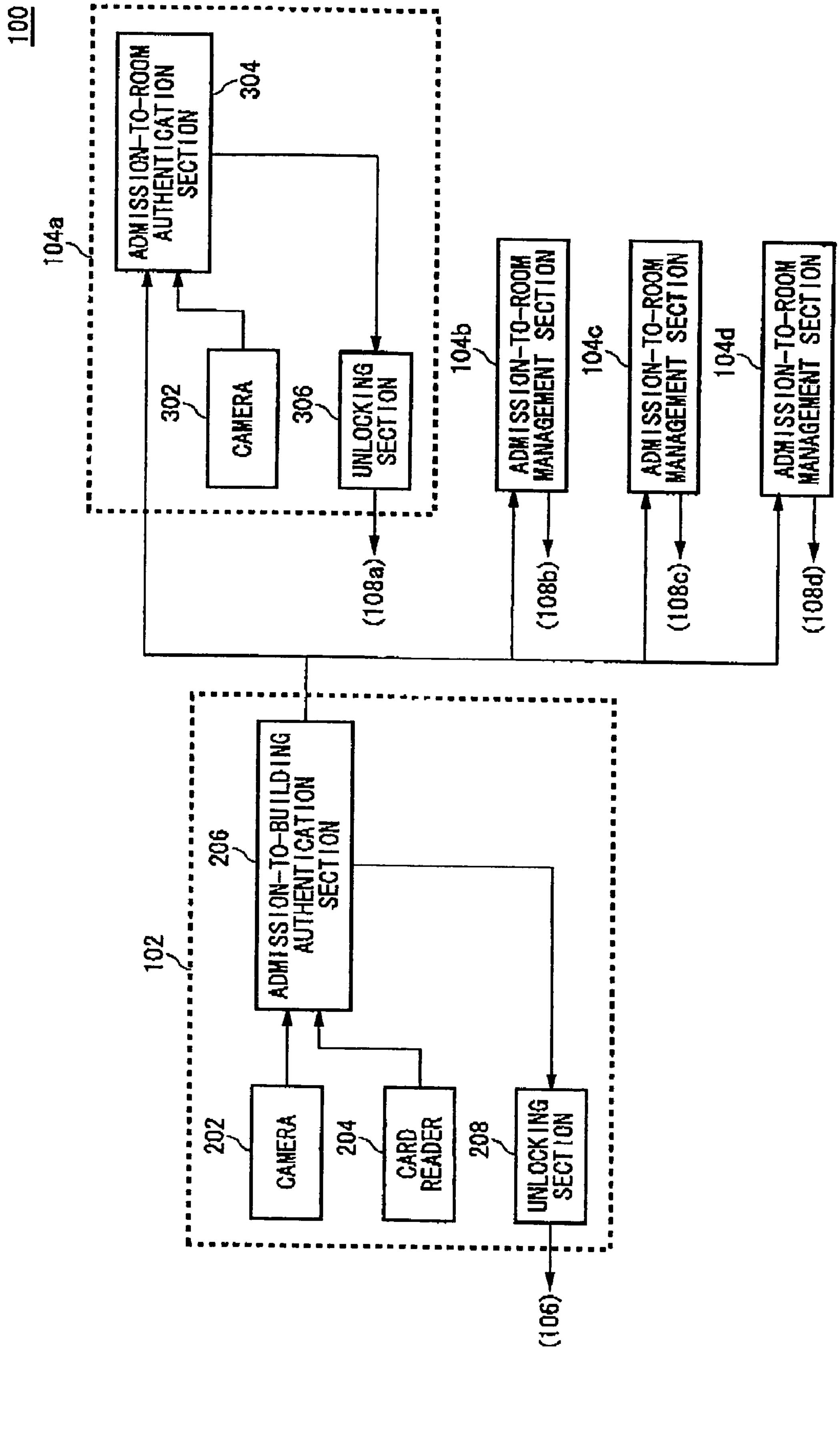
FIG. 2 is a block diagram exemplary illustrating a detailed configuration of the authentication system 100.

FIG. 2 is a block diagram exemplary illustrating a detailed configuration of the authentication system 100. In this example, the admission-to-building management section 102 includes an unlocking section 208, a camera 202, a card reader 204, and the admission-to-building authentication section 206. Each of the admission-to-room management sections 104*a-d* is provided corresponding to each of the living rooms A-D (refer to FIG. 1), and includes an unlocking section 306, a camera 302, and an admission-to-room authentication section 304, respectively.

The unlocking section 208 unlocks the door 106 at the front entrance when the person is authenticated by the admission-to-building authentication section 206. The camera 202 is an example of a first photographing section which photographs the person-to-be-authenticated. The camera 202 is provided at the front entrance, photographs the face of the person-to-be-authenticated who is going to enter, and sends it to the admission-to-building authentication section 206. The card reader 204 receives the face image of the person-to-be-authenticated stored on the ID card from the ID card retained by the person-to-be-authenticated, and sends it to the admission-to-building authentication section 206.

The admission-to-building authentication section 206 is an example of a first authentication section, and authenticates the person-to-be-authenticated by comparing the face image of the person-to-be-authenticated stored on the ID card retained by the person-to-be-authenticated with the face image of the person-to-be-authenticated photographed by the camera 202. Thereby, the admission-to-building authentication section 206 authenticates the person-to-be-authenticated photographed by the camera 202.

Then, when correlation between these face images is greater than a predetermined value, the person is authenticated to be an authenticated person and the admission-to-building authentication section 206 makes the unlocking section 208 unlock the front entrance. Thereby, the admission-to-building authentication section 206 opens the door 106 when it authenticates the person-to-be-authenticated to be the person who is permitted to pass the door 106 of the front entrance. Then, the admission-to-building authentication section 206 transmits the face image of the person-to-be-authenticated photographed by the camera 202 to the admission-to-room management sections 104*a-e*.

The unlocking section 306 of the admission-to-room management section 104 unlocks the door 108 at the entrance of each of the living rooms when the person-to-be-authenticated is authenticated by the admission-to-room authentication section 304. The camera 202 is provided at the corresponding entrance of each of the living rooms, photographs the face of the person-to-be-authenticated who is going to enter the room, and sends it to the admission-to-room authentication section 304. The camera 302 is an example of a second photographing section which photographs the person-to-be-authenticated, and is provided at the location through which the person-to-be-authenticated passes so that the person-to-be-authenticated may pass the location after the/she has passed the location at which the camera 202 is provided in the route.

The admission-to-room authentication section 304 is an example of a second authentication section which authenticates the person-to-be-authenticated, and compares the face image of the person-to-be-authenticated photographed by the camera 202 at the front entrance with the face image of the person-to-be-authenticated photographed by the camera 302 at the entrance of each of the living rooms by receiving the face image of the person-to-be-authenticated photographed by the camera 202 from the admission-to-building authentication section 206. Then, when the correlation between these face images are greater than a predetermined value, the person is authenticated as a person who is permitted to enter the room and the admission-to-room authentication section 304 makes the unlocking section 306 unlock corresponding one of the living rooms. Thereby, the admission-to-room authentication section 304 opens each of the doors 108*a-e* when it authenticates the person as a person who is permitted to pass each of the doors 108*a-e*. According to this example, the person can be authenticated efficiently at the entrance of each of the living rooms.

Moreover, the camera 202 may photograph an authentication image used by the admission-to-building authentication section 206 for the first authentication, and may further photograph a first comparison image, in which the person-to-be-authenticated is photographed and of which the area to be photographed is larger than the authentication image. Moreover, the camera 302 may photograph a second comparison image in which the person-to-be-authenticated is photographed and of which the area to be photographed is as same as the first comparison image. In this case, the admission-to-room authentication section 304 authenticates the person-to-be-authenticated by comparing the first comparison image and the second comparison image.

For example, when the admission-to-building authentication section 206 uses iris pattern of the person-to-be-authenticated and when the admission-to-room authentication section 304 uses the image of the face of the person-to-be-authenticated for the authentication, the camera 202 photographs the iris pattern of the person-to-be-authenticated as the authentication image, and photographs the image of the face of the person-to-be-authenticated as the first comparison image. Moreover, the camera 302 photographs the image of the face of the person-to-be-authenticated. Then, the admission-to-building authentication section 206 authenticates the person-to-be-authenticated when the authentication image is matched with the iris pattern which is given in advance, and the admission-to-room authentication section 304 authenticates the person-to-be-authenticated when the photographed image of the face is matched with the first comparison image and the second comparison image. By such an operation, precise authentication can be performed to prevent unauthorized admission to the building by the admission-to-building authentication section 206, and efficient authentication can be performed by the admission-to-room authentication section 304.

Moreover, as another example, the admission-to-building authentication section 206 may perform the first authentication based on the image of the face of the person-to-be-authenticated in the authentication image, and the admission-to-room authentication section 304 may authenticate the person-to-be-authenticated based on the image of face and dress of the person-to-be-authenticated in the first comparison image and the second comparison image. In this case, the camera 202 photographs the image of the face of the person-to-be-authenticated as the authentication image, and photographs the image including the face and dress of the person-to-be-authenticated by the image, of which the magnification is lower than that of the authentication image, as the first comparison image. Moreover, the camera 302 photographs the person-to-be-authenticated, of which the photographed area is substantially the same as the first comparison image, with substantially the same magnification as the fist comparison image, as the second comparison image.

In addition, when the correlation between the face image photographed by the camera 202 and the face image photographed by the respective camera 302 is greater than a predetermined value, and when the person-to-be-authenticated is registered in advance as an authorized person to enter the living room, the admission-to-room authentication section 304 may authenticate the person as an authorized person who is permitted to enter the room. The admission-to-room management section 104 may authenticate the person-to-be-authenticated further based on the information stored on the ID card retained by the person-to-be-authenticated. The admission-to-room management section 104 may receive the information stored on the ID card retained by the person-to-be-authenticated from the admission-to-building management section 102.

Moreover, when there are a plurality of persons inside the hall, the admission-to-room authentication section 304 may store a plurality of face images of the plurality of persons photographed by the camera 202, respectively. Then, when either of the plurality of stored face images and the face image photographed by the camera 302 are matched with each other, the admission-to-room authentication section 304 may make the unlocking section 306 unlock the living room. Moreover, the camera 302 may detect lighting conditions when the camera 202 photographs the person-to-be-authenticated, and may flare flashlight according to the detected lighting conditions.

Figure 3:
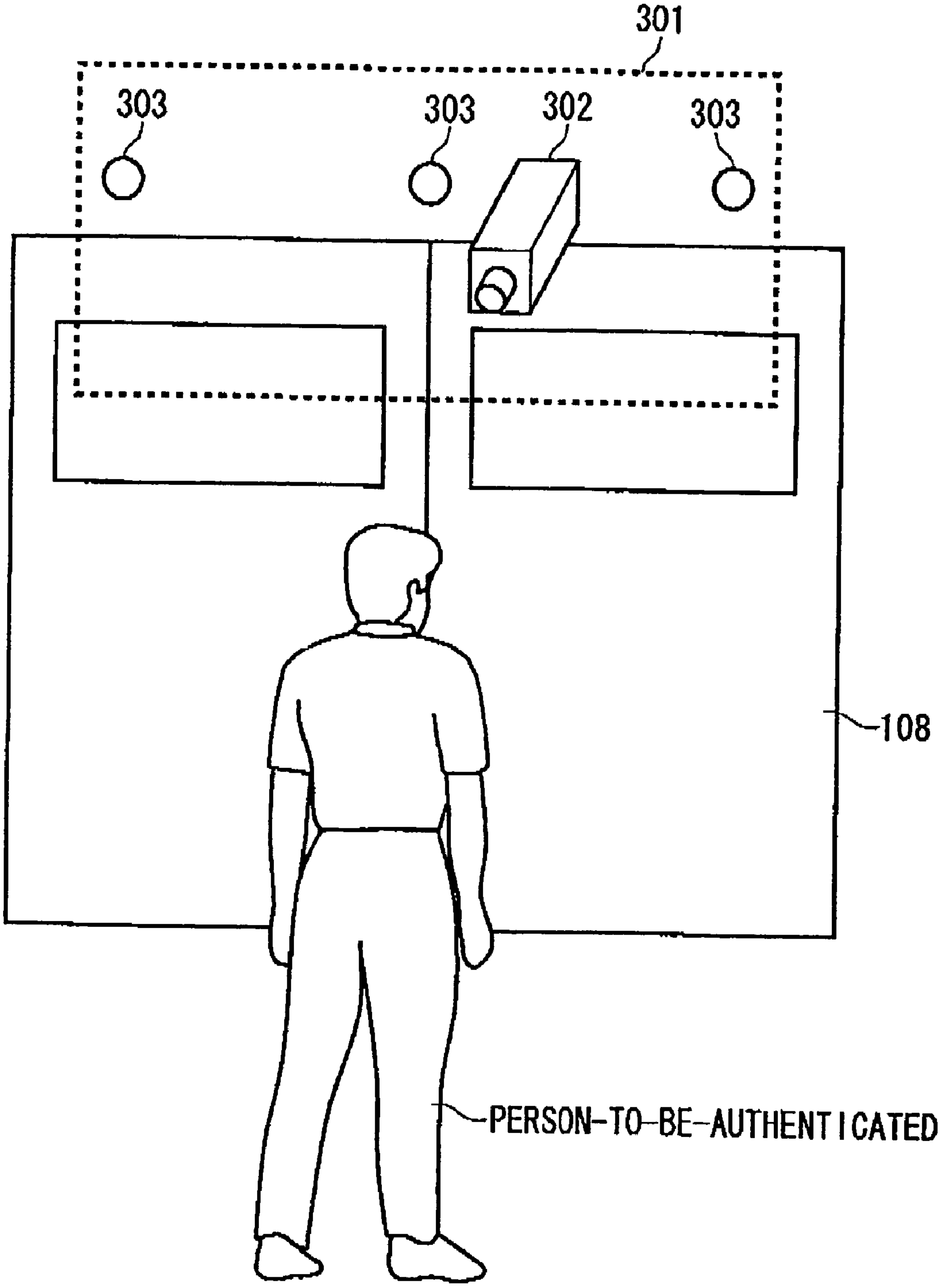
FIG. 3 is a schematic drawing exemplary illustrating a configuration of a second photographing section 301 which photographs a person-to-be-authenticated.

FIG. 3 is a schematic drawing exemplary illustrating a configuration of a second photographing section 301 which photographs a person-to-be-authenticated. The second photographing section 301 is provided at each door 108 illustrated in FIG. 1, and photographs the person-to-be-authenticated who passes the door 10B. The second photographing section 301 includes the camera 302 mentioned above and a flash section 303.

The flash section 303 can flare flashlight from a plurality of positions to the person-to-be-authenticated. Moreover, the flash section 303 flares the flashlight to the person-to-be-authenticated at desired luminous intensity. The admission-to-room authentication section 304 controls the position from which the flash section 303 flares the flashlight and the luminous intensity of the flashlight.

As mentioned above, the admission-to-room authentication section 304 detects lighting conditions when the camera 202 photographs the person-to-be-authenticated, and controls the luminous intensity of the flash section 303 and the location from which the flashlight is flared according to the detected lighting conditions. For example, the admission-to-room authentication section 304 detects the brightness of the image of the person-to-be-authenticated photographed by the camera 202, and controls the luminous intensity of the flash section 303 based on the brightness of the detected image. The admission-to-room authentication section 304 may control the luminous intensity of the flash section 303 to photograph the image having the same brightness as the detected image.

The admission-to-room authentication section 304 may detect a lighting direction when the camera 202 photographs the person-to-be-authenticated, and may control the position of the flash section 303 so that the direction of the flashlight from the flash section is substantially parallel with the lighting direction to the person-to-be-authenticated. For example, the admission-to-room authentication section 304 may detect the lighting direction based on the image of the person-to-be-authenticated photographed by the camera 202. Moreover, the lighting direction may be detected based on time when the camera 202 photographs the image of the person-to-be-authenticated. Since the lighting direction at a time of the camera 202 photographing the image of the person-to-be-authenticated is settled according to the solar position, the lighting direction may be detected easily based on the time.

Even if the lighting condition may become different depending on the photographing time because the camera 202 photographs the person-to-be-authenticated outdoors, the photographing of the camera 202 and the camera 302 may be done at substantially the same lighting condition according to the above-described embodiment. For this reason, the person-to-be-authenticated can be authenticated with sufficient accuracy by the admission-to-room authentication section 304.

Figure 4:
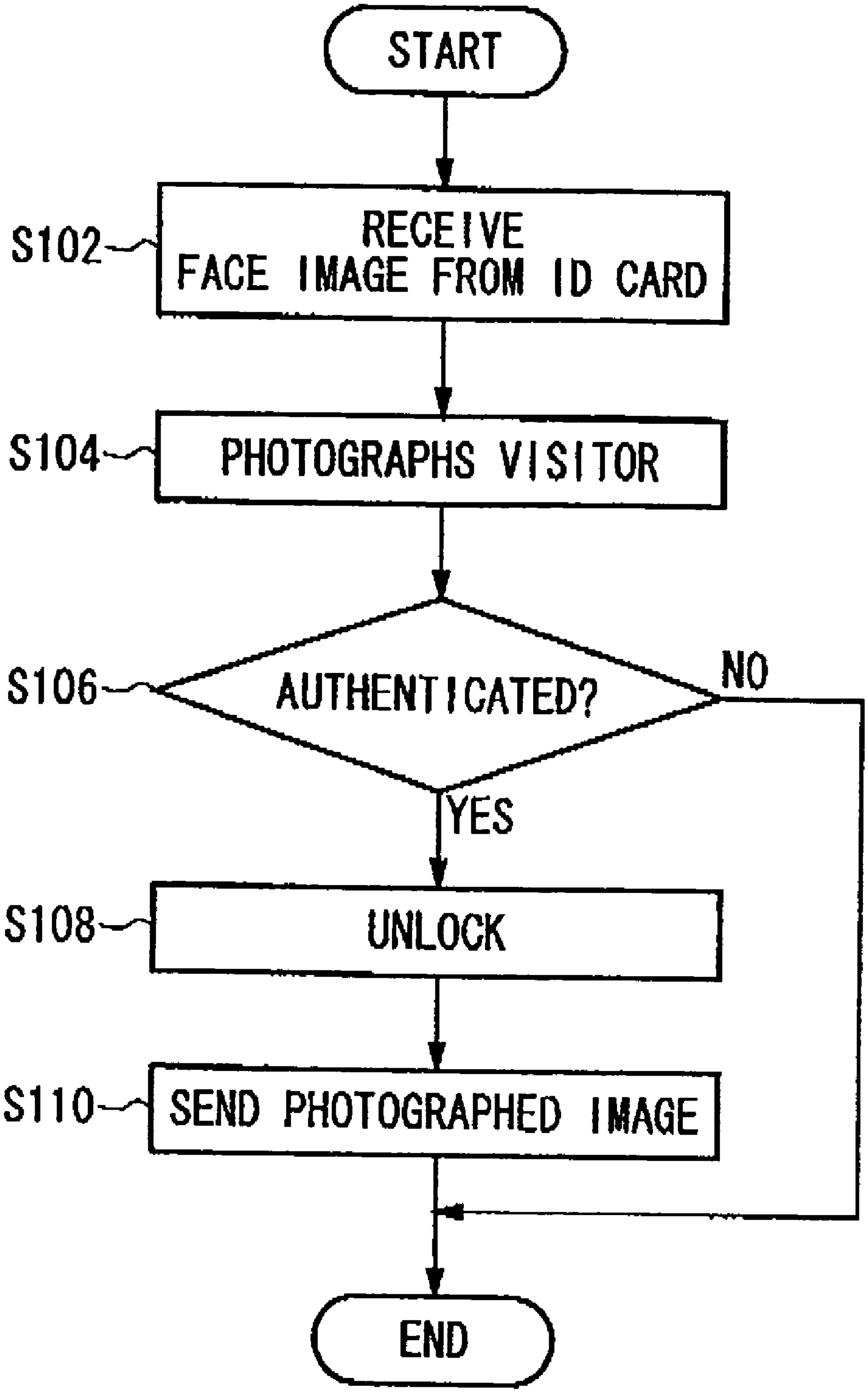
FIG. 4 is a flowchart exemplary illustrating operation of an admission-to-building management section 102.

FIG. 4 is a flowchart exemplary illustrating operation of the admission-to-building management section 102. When the person-to-be-authenticated comes in front of the front entrance, the card reader 204 first receives the face image of the visitor, who is the person-to-be-authenticated, from the ID card retained by the person-to-be-authenticated (S102), and sends it to the admission-to-building authentication section 206. Then, the camera 202 photographs the visitor's face image (S104), and sends it to the admission-to-building authentication section 206.

In addition, in S106, when the visitor is not authenticated as an authorized person, the admission-to-building management section 102 terminates the operation keeping the front entrance closed. In this case, the admission-to-building authentication section 206 may inform a terminal of a security company or the like that an unauthorized person is trying to enter the building.

Figure 5:
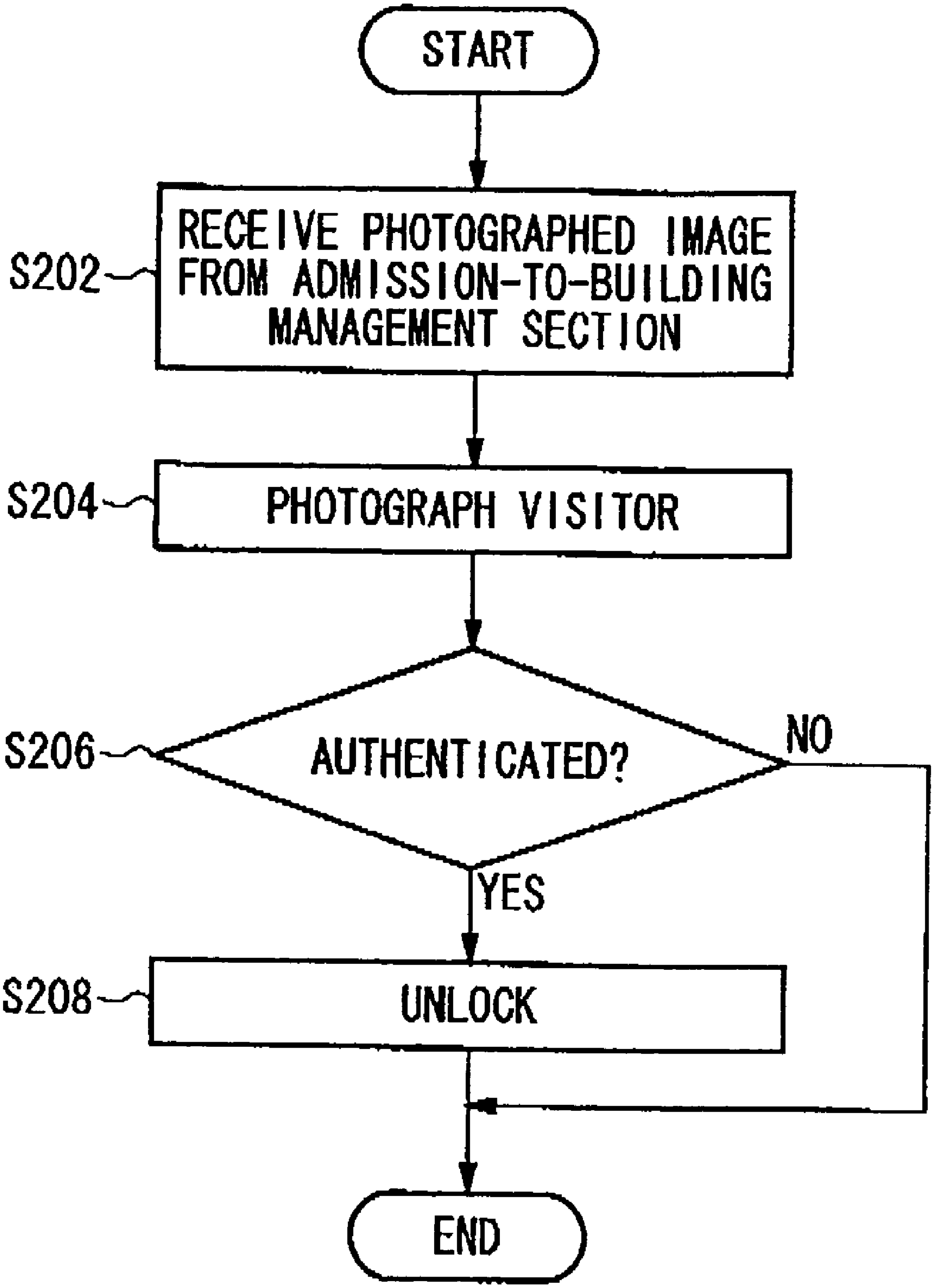
FIG. 5 is a flow chart exemplary illustrating operation of an admission-to-room management section 104.

FIG. 5 is a flow chart exemplary illustrating operation of the admission-to-room management section 104. As for the admission-to-room management section 104 of this example, the admission-to-room authentication section 304 first receives the visitor's face image photographed by the camera 202 from the admission-to-building authentication section 206 of the admission-to-building management section 102 (S202). Then, when the visitor, who is the person-to-be-authenticated, comes to the entrance of one of the living rooms, the camera 302 of the respective living room photographs face image of the visitor (S204), and sends it to the admission-to-room authentication section 304.

Then, when the person-to-be-authenticated is authenticated as an authorized person by the admission-to-room authentication section 304 (S206), the unlocking section 306 unlocks the door of the living room (S208). By this, the admission-to-room management section 104 terminates the authentication operation. According to the present example, the person-to-be-authenticated who enters each living room can be authenticated appropriately. In addition, when the person-to-be-authenticated is not authenticated as an authorized person in S206, the admission-to-room management section 104 terminates the operation keeping the door of the living room closed. In this case, the admission-to-room authentication section 304 may inform a terminal of a security company or the like-that an unauthorized person is trying to enter the living room.

Figure 6:
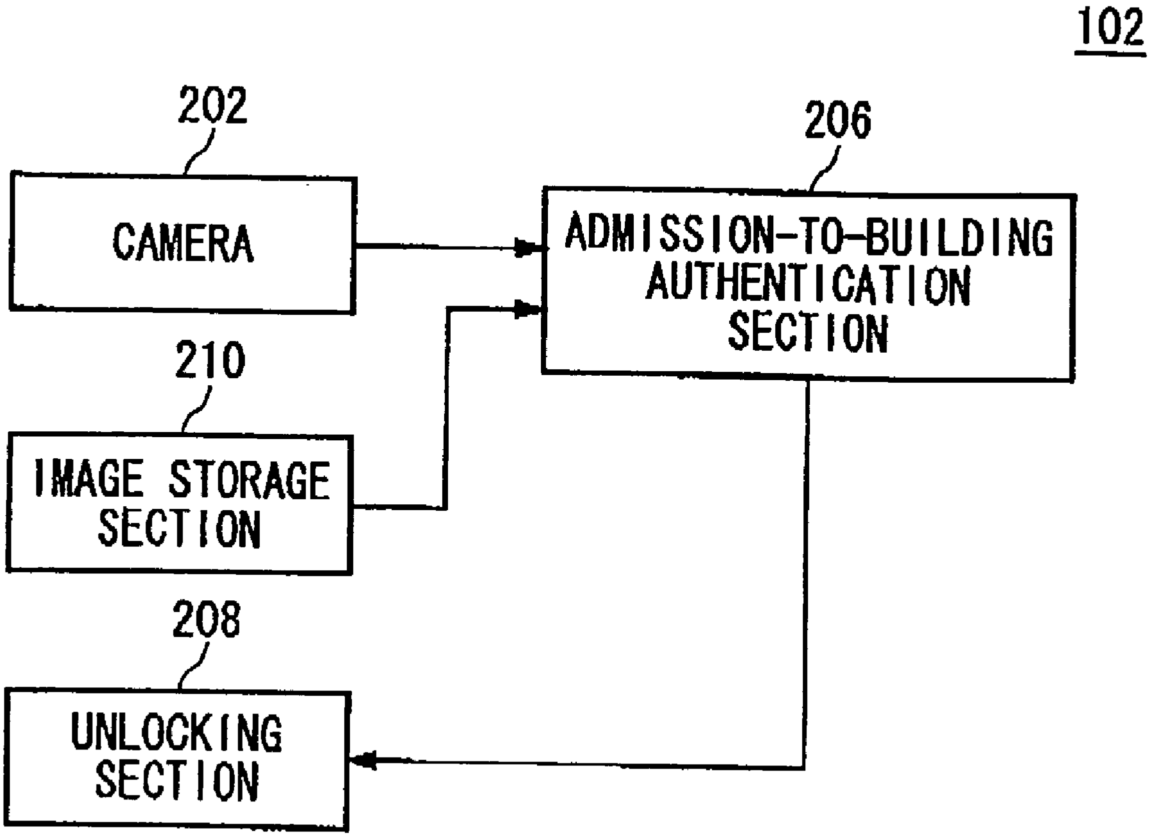
FIG. 6 is a block diagram illustrating another example of a configuration of the admission-to-building management section 102.

FIG. 6 is a block diagram illustrating another example of a configuration of the admission-to-building management section 102. The admission-to-building management section 102 according to the present example includes an image storage section 210 instead of the card reader 204 of the admission-to-building management section 102 illustrated with reference to FIG. 2. The image storage section 210 stores the face image of the person-to-be-authenticated in advance. In addition, in FIG. 6, since components bearing the same reference numerals as those depicted in FIGS. 1-5 have the same or similar function as/to the components depicted in FIGS. 1-5, the explanation will be omitted.

In this example, the admission-to-building authentication section 206 authenticates the person-to-be-authenticated by comparing the face image of the person-to-be-authenticated stored on the image storage section 210 with the image of the person-to-be-authenticated photographed by the camera 202. The admission-to-building authentication section 206 can authenticate the person-to-be-authenticated appropriately by deciding whether the visitor is an authorized person who has been registered in advance. Moreover, the admission-to-room management sections 104*a-d* respectively provided for the living rooms can perform authentication at the entrance of the living room efficiently by receiving the face image photographed by the camera 202.

Figure 7:
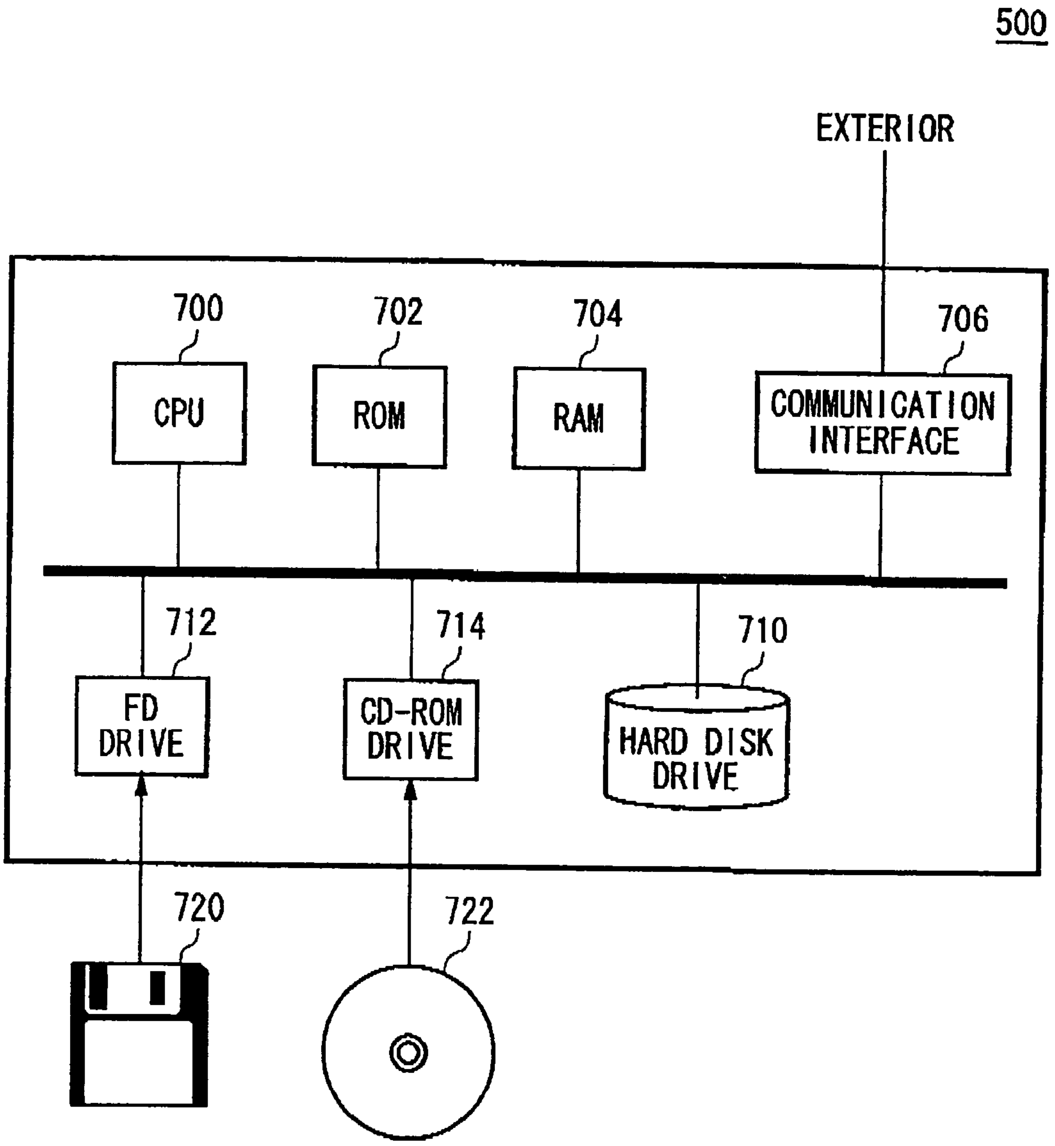
FIG. 7 is a block diagram exemplary showing a configuration of a computer 500 which controls the authentication system 100.

FIG. 7 illustrates an exemplary hardware configuration of a computer 500 for controlling the authentication system 100. In this example, the computer 500 stores a program that makes the authentication system 100 act as the authentication system 100 described with reference to FIGS. 1-6. Moreover the computer 500 may act as the admission-to-building authentication section 206 and the admission-to-room authentication section 304 of the authentication system 100.

The computer 500 includes a CPU 700, a ROM 702, a RAM 704, a communication interface 706, a hard disk drive 710, a flexible disk drive 712 and a CD-ROM drive 714. The CPU 700 operates based on a program stored on the ROM 702, the RAM 704, the hard disk drive 710, a flexible disk 720 and/or a CD-ROM 722.

For example, the program for operating the authentication system 100 makes the hard disk drive 710 act as the image storage section 210, and the CPU 700 act as the admission-to-the-building authentication section 206, the unlocking section 208, the admission-to-room authentication section 304, and/or the unlocking section 306.

The communication interface 706 communicates with the respective cameras 202 and 302, for example, and receives information related to statuses of the respective cameras etc., photographed images and the like and transmits control signals for controlling them. The hard disk drive 710, the ROM 702, or the RAM 704 as an exemplary storage device stores setting information, a program for making the CPU 700 work, and the like. That program may be stored on a recording medium such as a flexible disk 720 or a CD-ROM 722.

In a case where a flexible disk 720 stores a program, the flexible disk drive 712 reads out the program from the flexible disk 720 and provides it to the CPU 700. In a case where a CD-ROM 722 stores a program, the CD-ROM drive 714 reads out the program from the CD-ROM 722 and provides it to the CPU 700.

The program in the recording medium may be read out directly into the RAM 704 so as to be executed, or may be read out into the RAM 704 so as to be executed after being temporarily installed into the hard disk drive 710. Moreover, the program maybe stored on a single recording medium or a plurality of recording media. The program stored on the recording medium may provide the aforementioned functions by cooperation with an operating system. For example, the program may ask the operating system to perform a part or all of the functions and then provide the functions to the operating system based on a response from the operating system.

As the recording medium for storing the program, an optical recording medium such as a DVD and a PD, a magneto-optical recording medium such as an MD, a tape-like medium, a magnetic recording medium, a semiconductor memory such as an IC card and a miniature card, and the like, can be used other than the flexible disk and the CD-ROM. Moreover, a storage device such as a hard disk or RAM provided in a server system connected to an exclusive communication network or the Internet may be used as the recording medium.

Although the present invention has been described by way of exemplary embodiments, it should be understood that those skilled in the art might make many changes and substitutions without departing from the spirit and the scope of the present invention which is defined only by the appended claims.

What is claimed is:

1. An authentication system for authenticating a person-to-be-authenticated, comprising:

a first photographing section, which is provided in a route passed by the person-to-be-authenticated, which photographs the person-to-be-authenticated to obtain a first image;

a first authentication section which correlates the first image of the person-to-be-authenticated photographed by said first photographing section to a correlation image stored in advance of the person-to-be-authenticated having features distinct from features in the first image of the person-to-be-authenticated photographed by said first photographing section and which authenticates the person-to-be-authenticated when the correlation between the first image of the person-to-be-authenticated photographed by said first photographing section and the correlation image is greater than a predetermined threshold;

a second photographing section, which is provided at a location through which the person-to-be-authenticated passes, which photographs the person-to-be-authenticated to obtain a second image, wherein said second photographing section is located downstream of said first photographing section in the route passed by the person-to-be-authenticated; and a second authentication section which authenticates the person-to-be-authenticated by correlating the first image of the person-to-be-authenticated photographed by said first photographing section with the second image of the person-to-be-authenticated photographed by said second photographing section, wherein the features distinct from features in the first image of the person-to-be-authenticated by said first photographing section include features of the person-to-be-authenticated that are changed due to aging of the person-to-be-authenticated, wherein said first photographing section photographs a first comparison image in which the person-to-be-authenticated is photographed and of which a photographed area of the first comparison image to be photographed is larger than a photographed area of the correlation image stored in advance of the person-to-be-authenticated, wherein said second photographing section photographs a second comparison image in which the person-to-be-authenticated is photographed and of which a photographed area of the second comparison image is substantially the same as the photographed area of the first comparison image, and wherein said second authentication section authenticates the person-to-be-authenticated by comparing the first comparison image and the second comparison image.

2. The authentication system as claimed in claim 1, further comprising:

a first gate provided in the route passed by the person-to-be-authenticated;

a second gate provided at the location through which the person-to-be-authenticated passes, wherein said second gate is located downstream of said first gate in the route; and wherein:

said first authentication section opens said first gate when said first authentication section authenticates the person-to-be-authenticated as a person who is permitted to pass said first gate, and said second authentication section opens said second gate when said second authentication section authenticates the person-to-be-authenticated as a person who is permitted to pass said second gate.

3. The authentication system as claimed in claim 1, wherein the correlation image of the person-to-be-authenticated comprises an image of the person-to-be-authenticated stored on an ID card retained by the person-to-be-authenticated.

4. The authentication system as claimed in claim 1, further comprising an image storage section storing thereon an image of the person-to-be-authenticated in advance, wherein said first authentication section authenticates the person-to-be-authenticated by comparing the correlation image of the person-to-be-authenticated stored on said image storage section with the first image of the person-to-be-authenticated photographed by said first photographing section.

5. The authentication system as claimed in claim 1, wherein said first authentication section performs the first authentication based on image of face of the person-to-be-authenticated in the authentication image, and said second authentication section authenticates the person-to-be-authenticated based on image of face and dress of the person-to-be-authenticated in the first comparison image and the second comparison image.

6. The authentication system as claimed in claim 1, wherein said second authentication section computes lighting conditions when said first photographing section photographs the person-to-be-authenticated based on the first image of the person-to-be-authenticated photographed by said first photographing section, and controls the lighting conditions at a time of the second photographing section photographing the person-to-be-authenticated according to the computed lighting conditions.

7. The authentication system as claimed in claim 6, wherein said second photographing section comprises a flash section operable to flare flashlight to the person-to-be-authenticated, and said second authentication section detects brightness of the image of the person-to-be-authenticated photographed by said first photographing section, and controls a luminous intensity of said flash section based on the detected brightness of the image of the person-to-be-authenticated.

8. The authentication system as claimed in claim 1, wherein said correlation image is photographed prior to the person-to-be-authenticated beginning the route.

9. The authentication system as claimed in claim 1, wherein the features distinct from features in the first image of the person-to-be-authenticated by said first photographing section include features of the person-to-be-authenticated that are changed due to a change in dress of the person-to-be-authenticated.

10. The authentication system as claimed in claim 9, wherein the features of the person-to-be-authenticated that are changed due to a change in dress of the person-to-be-authenticated include facial features of the person-to-be-authenticated that are changed due to makeup.

11. The authentication system as claimed in claim 1, wherein the features distinct from features in the first image of the person-to-be-authenticated by said first photographing section include features of the person-to-be-authenticated that are changed due to a change in weight of the person-to-be-authenticated.

12. A computer-readable storage medium containing a plurality of machine readable instructions for operating an authentication system for authenticating a person-to-be-authenticated, wherein when the instructions are executed, the instructions causes the authentication system to act as:

a first photographing section, which is provided in a route passed by the person-to-be-authenticated, which photographs the person-to-be-authenticated to obtain a first image;

a first authentication section which correlates the first image of the person-to-be-authenticated photographed by said first photographing section to a correlation image stored in advance of the person-to-be-authenticated having features distinct from features in the first image of the person-to-be-authenticated photographed by said first photographing section and which authenticates the person-to-be-authenticated when the correlation between the first image of the person-to-be-authenticated photographed by said first photographing section and the correlation image is greater than a predetermined threshold;

a second photographing section, which is provided at a location through which the person-to-be-authenticated passes, which photographs the person-to-be-authenticated to obtain a second image, wherein said second photographing section is located downstream of said first authentication section in the route passed by the person-to-be-authenticated; and a second authentication section which authenticates the person-to-be-authenticated by correlating the first image of the person-to-be-authenticated photographed by said first photographing section with the second image of the person-to-be-authenticated photographed by said second photographing section, wherein the features distinct from features in the first image of the person-to-be-authenticated by said first photographing section include features of the person-to-be-authenticated that are changed due to aging of the person-to-be-authenticated, wherein said first photographing section photographs a first comparison image in which the person-to-be-authenticated is photographed and of which a photographed area of the first comparison image to be photographed is larger than a photographed area of the correlation image stored in advance of the person-to-be-authenticated, wherein said second photographing section photographs a second comparison image in which the person-to-be-authenticated is photographed and of which a photographed area of the second comparison image is substantially the same as the photographed area of the first comparison image, and wherein said second authentication section authenticates the person-to-be-authenticated by comparing the first comparison image and the second comparison image.

13. A building equipped with an authentication system for authenticating a person-to-be-authenticated, comprising;

a first gate provided in a route passed by the person-to-be-authenticated;

a first photographing section, which is provided in the mute, which photographs the person-to-be-authenticated to obtain a first image;

a first authentication section which correlates the first image of the person-to-be-authenticated photographed by said first photographing section to a correlation image stored in advance of the person-to-be-authenticated having features distinct from features in the first image of the person-to-be-authenticated photographed by said first photographing section and which authenticates the person-to-be-authenticated when the correlation between the first image of the person-to-be-authenticated photographed by said first photographing section and the correlation image is greater than a predetermined threshold;

a second gate provided at the location through which the person-to-be-authenticated passes, wherein said second gate is located downstream of said first gate in the route passed by the person-to-be-authenticated;

a second photographing section which photographs the person-to-be-authenticated to obtain a second image, wherein said second photographing section is located downstream of said first photographing section in the route passed by the person-to-be-authenticated; and a second authentication section which authenticates the person-to-be-authenticated by correlating the first image of the person-to-be-authenticated photographed by said first photographing section with the second image of the person-to-be-authenticated photographed by said second photographing section, wherein said first authentication section opens said first gate when said first authentication section authenticates the person-to-be-authenticated as a person who is permitted to pass said first gate, and said second authentication section opens said second gate when said second authentication section authenticates the person-to-be-authenticated as a person who is permitted to pass said second gate, wherein the features distinct from features in the first image of the person-to-be-authenticated by said first photographing section include features of the person-to-be-authenticated that are changed due to aging of the person-to-be-authenticated, wherein said first photographing section photographs a first comparison image in which the person-to-be-authenticated is photographed and of which a photographed area of the first comparison image to be photographed is larger than a photographed area of the correlation image stored in advance of the person-to-be-authenticated, wherein said second photographing section photographs a second comparison image in which the person-to-be-authenticated is photographed and of which a photographed area of the second comparison image is substantially the same as the photographed area of the first comparison image, and wherein said second authentication section authenticates the person-to-be-authenticated by comparing the first comparison image and the second comparison image.

* * * * *